(12) United States Patent
Al-Jafar

(10) Patent No.: US 8,564,425 B2
(45) Date of Patent: Oct. 22, 2013

(54) BLIND SPOT MONITORING SYSTEM

(76) Inventor: Ahmad I. S. I. Al-Jafar, Al-Quran (KW)

( * ) Notice: Subject to any disclaimer, the term of this patent is extended or adjusted under 35 U.S.C. 154(b) by 262 days.

(21) Appl. No.: 13/213,168

(22) Filed: Aug. 19, 2011

(65) Prior Publication Data

US 2013/0043990 A1 Feb. 21, 2013

(51) Int. Cl.
*B60Q 1/00* (2006.01)
*G08G 1/16* (2006.01)

(52) U.S. Cl.
USPC ........... 340/439; 340/435; 340/436; 340/903; 180/167; 367/93; 362/494

(58) Field of Classification Search
USPC .................................. 340/439, 435, 436, 903
See application file for complete search history.

(56) References Cited

U.S. PATENT DOCUMENTS

| | | | |
|---|---|---|---|
| 4,694,295 | A | 9/1987 | Miller et al. |
| 4,943,796 | A | 7/1990 | Lee |
| 6,193,380 | B1 | 2/2001 | Jacobs |
| 6,198,409 | B1 | 3/2001 | Schofield et al. |
| 6,727,808 | B1 | 4/2004 | Uselmann et al. |
| 6,979,090 | B1 | 12/2005 | Wnuk |
| 7,385,488 | B2 | 6/2008 | Kim |

*Primary Examiner* — Donnie Crosland
(74) *Attorney, Agent, or Firm* — Richard C. Litman

(57) ABSTRACT

A blind spot monitoring and visual display for a motor vehicle includes a pair of side mounted rear view mirrors with one of the rear view mirrors mounted on each side of the motor vehicle. The system also includes a pair of electronic or ultrasonic sensors with one of the sensors disposed on an outer edge of each of the mirrors and each of said sensors constructed and arranged to monitor the blind spots on each side of the motor vehicle. The system also includes a pair of warning lights with one of the warning lights disposed on an inner edge of each of the mirrors to indicate that there is another vehicle in one of the blind spots. In addition, there is a third sensor for sensing the position of the steering wheel or front wheels of the motor vehicle and an audio alarm for warning a driver that there is another motor vehicle in the area that he is moving into to avoid an eminent accident.

7 Claims, 3 Drawing Sheets

BLIND SPOT MONITORING SYSTEM

FIELD OF THE INVENTION

This invention relates to a blind spot monitoring system and more particularly to a blind spot monitoring system and visual display for a motor vehicle that warns a driver of another motor vehicle in the driver's blind spot and a potential accident for failing to postpone a lane change.

BACKGROUND FOR THE INVENTION

Vehicle blind spot detectors are well known and have been in use for many years. For example a vehicle blind spot detector is disclosed in a U.S. Patent of Miller et al. U.S. Pat. No. 4,694,295. As disclosed therein, a driver in trying to manage the directional control of his vehicle is often seen rotating his head or torso beyond 90 degrees (past perpendicular) in an effort to gain intelligence about what competing vehicles are flanking his "blindsides." Such a competing vehicle may occupy that area in the "blindside" (left, right or both sides past perpendicular) not directly observable through the rear view mirror. The requirement to make an extraordinary inspection of the vehicle "blindside" is often exacerbated by the poor design utility of the vehicle itself. Those who are physically unable to check the blind spot knowingly risk collision. The patent disclosure is a high technology effort to address the solution to this problem. A sequentially operating dual sensor technology is used. The first sensor effort takes place as a photonic event. An infrared light emitting diode is coupled to an infrared sensitive phototransistor or photo-darlington (PD) thorough the reflectance of incident light energy from the target vehicle. Once detected, a present time delayed switch is made which activates operation of the second sensor. The second sensor is ultrasonic. The vehicle operator is actually given the distance in feet between his vehicle and the threat obstacle.

A more recent U.S. Pat. No. 6,198,409 of Schofield et al. discloses a vehicle rear view display system wherein the system displays indications from a blind spot detector. The system includes a first indicator assembly positioned on the vehicle in the vicinity of an exterior mirror and adapted to producing an indication at least of the presence of an object adjacent the corresponding side of the vehicle. A second indicator assembly is provided on the vehicle interior mirror assembly and adapted to produce an indication at least of the presence of an object adjacent the same corresponding side of the vehicle. In this manner redundant indications are provided at both the interior and exterior mirrors in order to assist a driver in a premaneuver evaluation of conditions surrounding the vehicle.

In addition, a U.S. Pat. No. 6,727,808 of Uselmann et al. discloses a sonic blind spot monitoring system for alerting a driver when a vehicle is positioned in a blind spot. The sonic blind spot monitoring system includes a vehicle. A sonar device is coupled to the vehicle for emitting a sonar wave into an area adjacent to the vehicle corresponding to a blind spot for a driver of the vehicle. The sonar device includes a sonar receptor for receiving a reflection of the sonar wave for detecting an object in the blind spot. A display device is coupled to the vehicle. The display device is positioned within the vehicle whereby the display device is visible to the driver of the vehicle. The display device is operationally coupled to the sonar device for displaying a visual signal when the sonar device detects an object in the blind spot.

Notwithstanding the above it is presently believed that there is a need and a potential commercial market for an improved blind spot monitoring system in accordance with the present invention. There should be a demand for such systems because such systems can prevent serious accidents and alert a driver of a motor vehicle that is about to strike or be struck by an approaching vehicle. It is also believed that the system in accordance with the present invention is reliable in service, durable, and can be manufactured and sold at a competitive price.

BRIEF SUMMARY OF THE INVENTION

A blind spot monitoring system and visual display for a motor vehicle includes a pair of side mounted rear view mirrors with one of the mirrors mounted on each side of the motor vehicle. In this way a driver can monitor each side of the motor vehicle for other motor vehicles. In the system in accordance with the present invention a pair of electronic or ultrasonic detectors/sensors with one of the electronic or ultrasonic detectors/sensors mounted on an outside of each of the mirrors for sensing or detecting other motor vehicles in a driver's blind spot. The system also includes a pair of light signals with one of the light signals mounted on the inside of each of the mirrors for warning a driver of a motor vehicle in a blind spot. In addition, the system includes a sensor for sensing the position of a steering wheel of the driven motor vehicle and an audio alarm for sounding a warning when the position of the steering wheel or front wheels of the vehicle indicate that the motor vehicle is about to change lanes. This occurs when an other motor vehicle is in a blind spot so that a lane change could result in an accident.

The invention will now be described in connection with the following drawings wherein like reference numerals have been used to identify like parts.

DESCRIPTION OF THE PREFERRED EMBODIMENTS OF THE INVENTION

Figure 1:
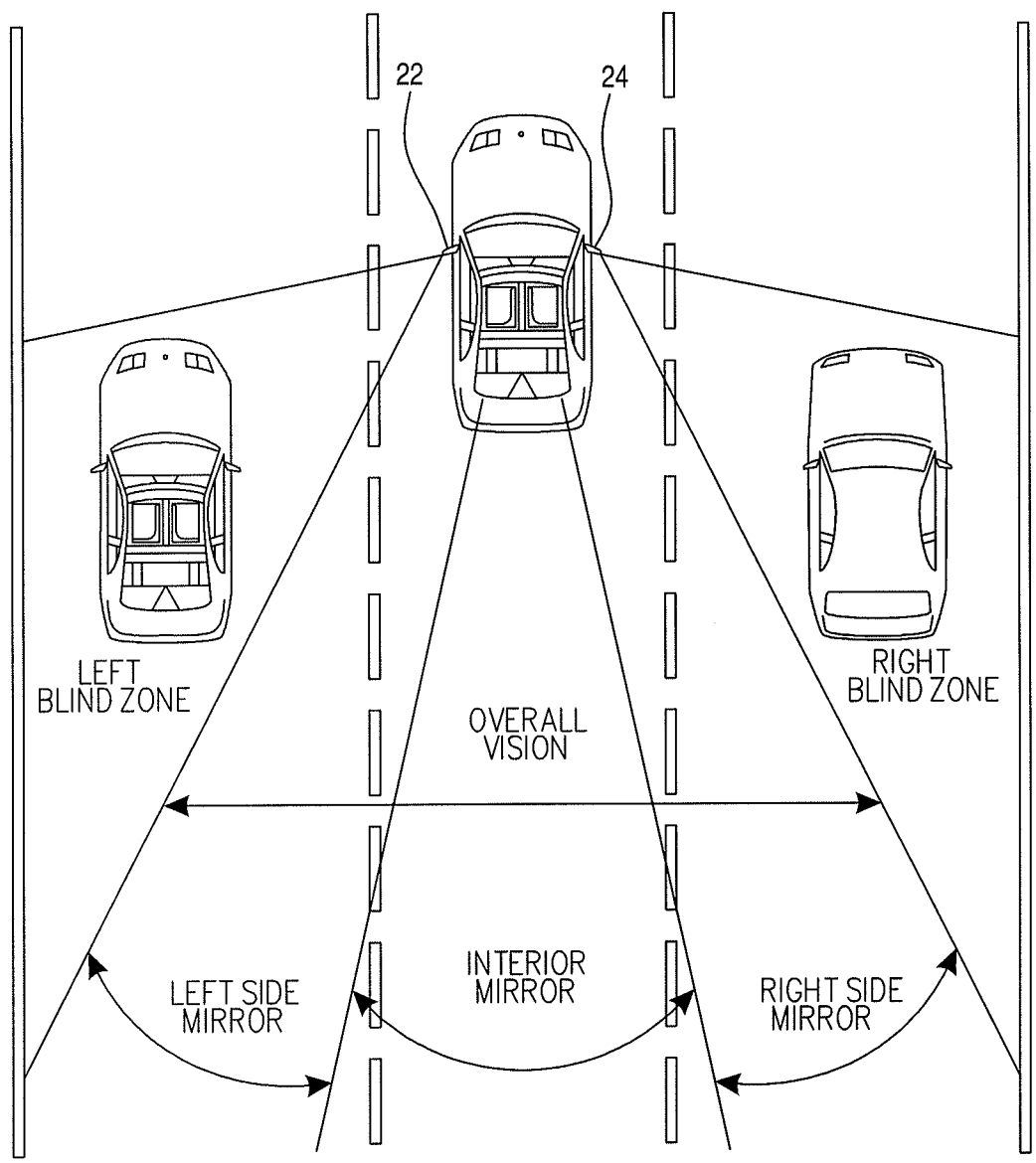
FIG. 1 is a schematic illustration of three motor vehicles with one of the vehicles in a left blind spot and a second vehicle in a right blind spot.

Reference is now made to FIGS. 1-4, wherein new blind spot monitoring systems and visual displays in accordance with the present invention are generally designated by the reference numeral 20.

Figure 4:
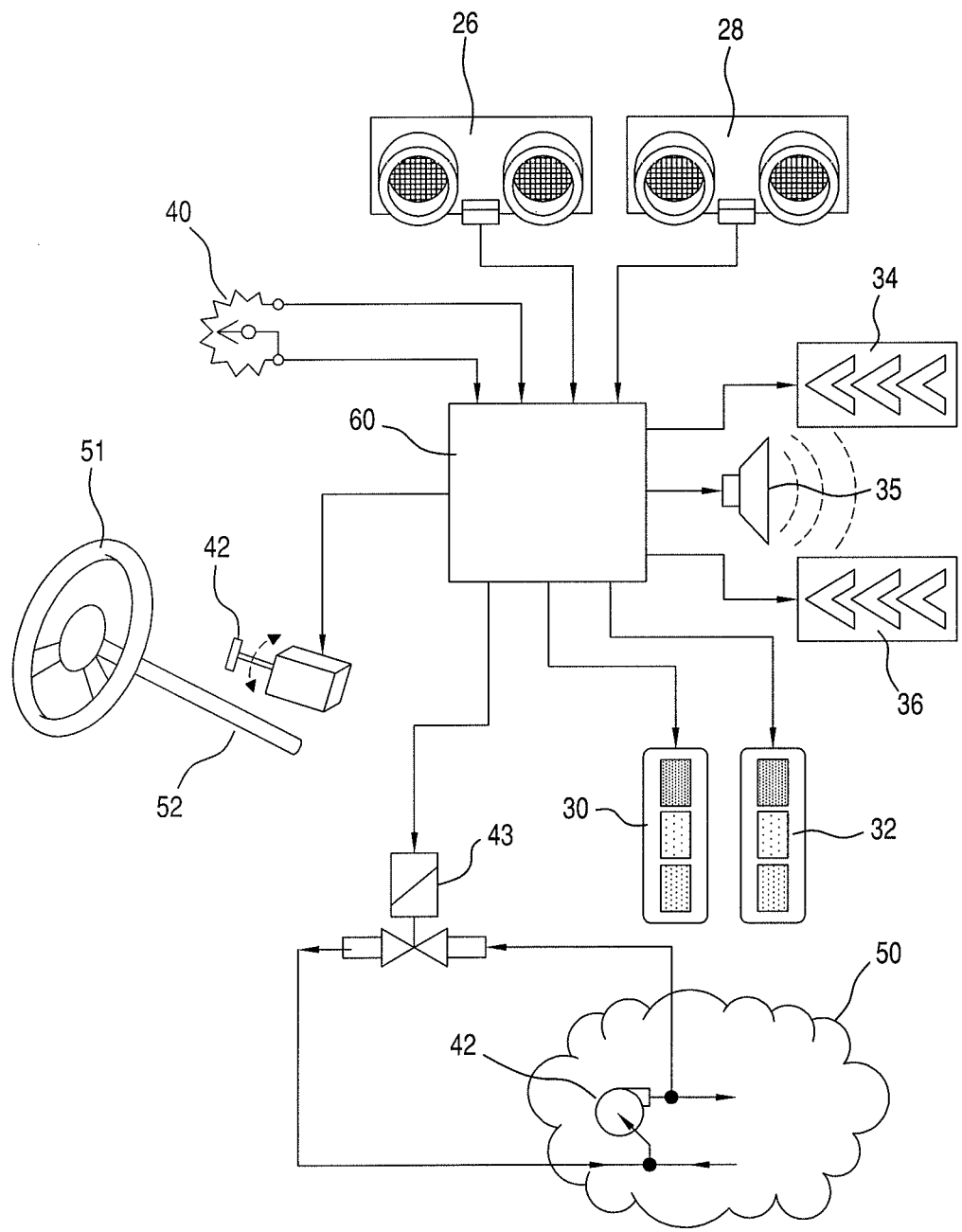
FIG. 4 is a schematic illustration of a system according to a further embodiment of the invention.

As shown in FIGS. 1 and 4, a blind spot monitoring system and visual display 20 comprises and/or consists of a pair of side mounted rear view mirrors 22 and 24 with one mirror 22 mounted on the driver's side of the vehicle and the second mirror 24 mounted on the passenger side. Both mirrors are positioned and adjustable for viewing by the driver to see a vehicle behind the operated vehicle as with conventional side mounted mirrors. However, the mirrors 22 and 24, like conventional mirrors, do not warn a driver or operator of another vehicle that is being operated in one of the blind spots as illustrated in FIG. 1.

The system in accordance with the present invention also includes a pair of electronic or ultrasonic detectors or sensors 26 and 28. A first sensor 26 is disposed on the outside periphery or frame of the mirror 22 while the second sensor is disposed on the outside periphery or frame of the second mirror 24. The detector or sensors 26 and 28 are constructed and dimensioned to sense a motor vehicle in either of two blind spots on the side of the car. For example the driver's view on the inside and outside of the normal view on each side of the operated vehicle is expanded as illustrated in FIG. 1.

Each of the mirrors 22 and 24 also include two warning lights 30 and 32 with one light on the inside of each of the mirror's inner edges. For example, in a first preferred embodiment of the invention the warning light is one relatively large light that lights up to warn a driver that an other motor vehicle is approaching from the rear of the auto and located in the blind spot. In the second preferred embodiment of the invention, the warning light includes three separate LEDs, a top or red segment, a yellow middle segment and a green lower segment as an indication of the proximity of an overtaking vehicle.

Figure 2:
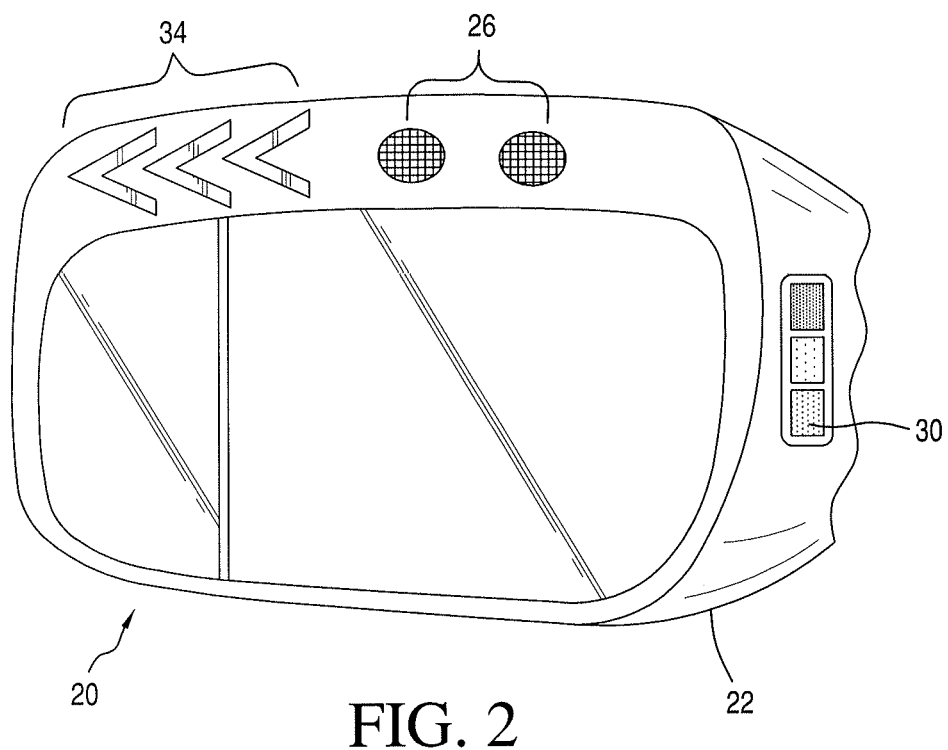
FIG. 2 illustrates a second embodiment of the invention wherein a side mounted mirror with an electronic sensor and three color display lights adjacent to an interior edge of a mirror.
Figure 3:
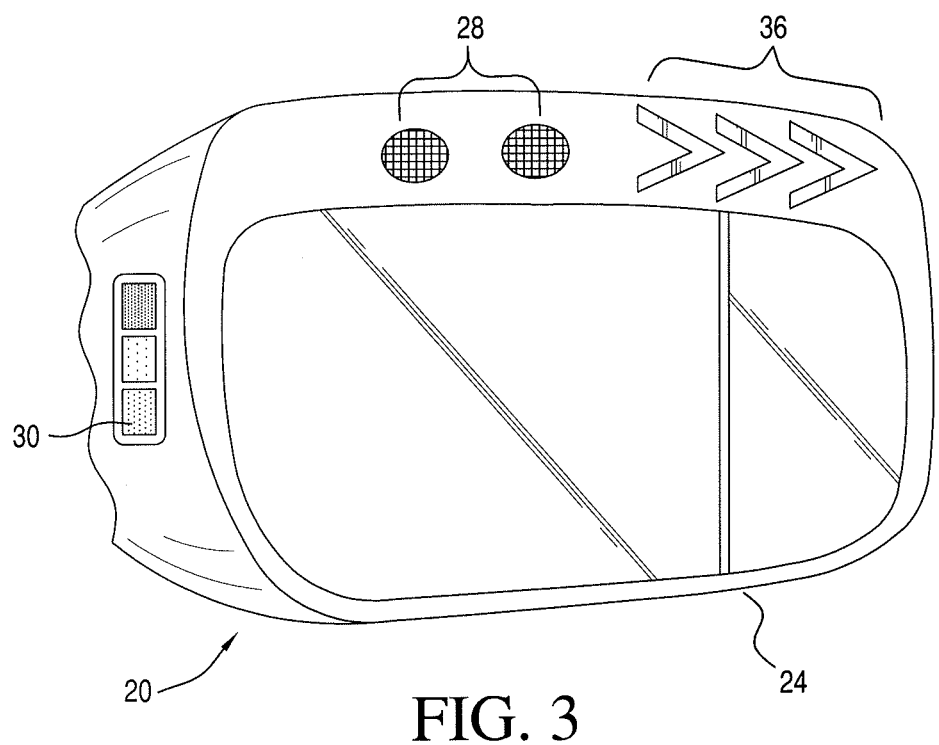
FIG. 3 is a schematic illustration of a second embodiment of the invention wherein a side mounted rear view mirror includes a sensor and warning device.

A further embodiment of the invention contemplates the use of a pair of split mirrors as illustrated in FIGS. 2 and 3 wherein the use of two planar segments for each mirror with each segment as an angularly offset from the adjacent segment to expand the view in the mirror and reduce a blind spot or spots. In a still further embodiment shown in FIG. 3 one of the segments in each of the mirrors is planar and the adjacent segment is convex which even further reduces the width of a blind spot.

An important feature in the present invention relates to a sensor 40 for sensing the position of a steering wheel and/or the front wheels of a vehicle and an audio alarm for sounding an alarm when the position of the steering wheel or front wheels indicate a driver's intent to change lanes when another vehicle is in that lane. Then when the system detects a movement of the steering wheel or front wheels of the motor vehicle that indicates an intent or imminent movement to change lanes and at the same time the system senses an overtaking vehicle in the lane that the operated vehicle is heading, a loud audio alarm is sounded. The audio alarm could be a voice warning such as "NO!! DANGER DO NOT CHANGE LANES." With this warning an imminent accident can be avoided.

In the preferred embodiment of the invention a blind spot monitoring system 20 and visual display consists of a pair of side mounted rear view mirrors 22 and 24 with one of said mirrors mounted on each side of a motor vehicle in a conventional manner for a driver to monitor each side of the vehicle for other motor vehicles that may be attempting to pass the driver. The system 20 also includes a pair of ultrasonic detectors or sensors 26 and 28 with one of the detectors or sensors disposed on an outside edge of each mirror. These sensors are preferably constructed and arranged to view the blind spots as illustrated in FIG. 1 on each side of the vehicle, namely one on the inside of the mirrors normal view and the other on the outside as illustrated in FIG. 1. In addition to the two ultrasonic sensors, the system 20 also includes two warning lights 30 and 32 with one warning on an inside edge of each of the mirrors 22 and 24 that are a lighted in response to another vehicle in one of the blind spots. In this embodiment of the invention each of the warning lights is a relatively large bright red light so that a driver knows not to turn into that lane.

The major elements of the sensor include an infrared sensor which includes the infrared light emitter, the light detector and the electric drive circuit. A time trigger switch that responds to a signal from the infrared sensor indicates that a converging vehicle is within a given distance and activates the ultrasonic transducer after a preset time delay. After elapse of the delay the ultrasonic transducer with its associated control circuits is activated and starts sending distance ranging sound bursts which are reflected by the converging vehicle as echoes returning to the transducer 22 after a ranging time equal to twice the sound propagation delay between the two vehicles. The electric control circuitry is capable of measuring the propagation delay and therefore measuring the distance to the converging vehicle. A description of a suitable sensor and warning system is included in the U.S. Pat. No. 4,694,295 that is incorporated herein in its entirety by reference.

While the invention has been described in connection with its preferred embodiments it should be recognized that changes and modifications may be made therein without departing from the scope of the appended claims.

What is claimed is:

1. A blind spot monitoring system and visual display for a motor vehicle, said system comprising a pair of side mounted rear view mirrors with one of said mirrors mounted on each side of said motor vehicle for a driver to monitor each side of the motor vehicle for other motor vehicles and a pair of electronic or ultrasonic detectors/sensors with one of said electronic or ultrasonic detectors/sensors mounted on an outside edge of each of said mirrors for sensing/detecting other motor vehicles in a driver's blind spot and a pair of light signals with one of said light signals mounted on the inside of each of said mirrors for warning a driver of a motor vehicle in a blind spot and means for sensing the position of a steering wheel of the motor vehicle and an audio alarm for sounding a warning when the position of the steering wheel indicates that the motor vehicle is about to change lanes and another motor vehicle is in a blind spot and that a lane change could result in an accident.

2. A blind spot monitoring system and visual display for a motor vehicle according to claim 1 in which each of said light signals is a relatively large red light.

3. A blind spot monitoring system and visual display for a motor vehicle according to claim 1 in which each of said light signals include three LEDs of different colors to indicate the proximity of another motor vehicle in a blind spot.

4. A blind spot monitoring system and visual display for a motor vehicle according to claim 1 in which each of said side mounted mirrors include two separate portions directed separately at different angles to broaden the driver's view of an area and to one side of the motor vehicle.

5. A blind spot monitoring system and visual display for a motor vehicle according to claim 4 in which each of said two portions of said side mounted mirrors are flat.

6. A blind spot monitoring system and visual display for a motor vehicle according to claim 4 in which one portion of each of said side mounted mirrors is flat and the other portion is convex.

7. A blind spot monitoring system and visual display for a motor vehicle, said system consisting of:
a pair of side mounted rear view mirrors with one of said pair of mirrors mounted on each side of said motor vehicle for a driver to monitor each side of the motor vehicle for other motor vehicles;
a pair of ultrasonic sensors with one of said pair of ultrasonic sensors mounted on an outside edge of each of said mirrors for sensing another motor vehicle in a driver's blind spot;
a pair of light signals with one of said pair of light signals mounted on the inside edge of each of said side mounted mirrors for warning a driver of another motor vehicle in a blind spot and wherein each of said light signals include three LEDs of different colors to indicate the proximity of another motor vehicle in a blind spot;

means for sensing the position of a steering wheel of the motor vehicle and an audio alarm for sounding a warning when the position of the steering wheel indicates that the motor vehicle is about to change lanes and another motor vehicle is in a blind spot so that a change of lanes could result in an accident.

* * * * *